United States Patent
Isman et al.

(10) Patent No.: US 10,936,289 B2
(45) Date of Patent: *Mar. 2, 2021

(54) FORMAT-SPECIFIC DATA PROCESSING OPERATIONS

(71) Applicant: Ab Initio Technology LLC, Lexington, MA (US)

(72) Inventors: Marshall A. Isman, Newton, MA (US); John Joyce, Newton, MA (US)

(73) Assignee: Ab Initio Technology LLC, Lexington, MA (US)

( * ) Notice: Subject to any disclaimer, the term of this patent is extended or adjusted under 35 U.S.C. 154(b) by 232 days.

This patent is subject to a terminal disclaimer.

(21) Appl. No.: 15/433,467

(22) Filed: Feb. 15, 2017

(65) Prior Publication Data

US 2017/0351494 A1 Dec. 7, 2017

Related U.S. Application Data

(60) Provisional application No. 62/345,217, filed on Jun. 3, 2016.

(51) Int. Cl.
*G06F 8/41* (2018.01)
*G06F 16/25* (2019.01)
(Continued)

(52) U.S. Cl.
CPC ............... *G06F 8/433* (2013.01); *G06F 8/70* (2013.01); *G06F 8/71* (2013.01); *G06F 11/3664* (2013.01);
(Continued)

(58) Field of Classification Search
CPC ............... G06F 17/30569; G06F 17/30958
See application file for complete search history.

(56) References Cited

U.S. PATENT DOCUMENTS 5,966,072 A 10/1999 Stanfill et al.
6,102,968 A 8/2000 Colby et al.
(Continued)

FOREIGN PATENT DOCUMENTS

CN 1936860 3/2007
CN 102713864 10/2012
(Continued)

OTHER PUBLICATIONS

Agarwal et al., "SINNET: Social Interaction Network Extractor from Text", Proceedings of IJCNLP 2013, pp. 33-36, Oct. 14-18, 2013 (Year: 2013).*

(Continued)

*Primary Examiner* — Doon Y Chow
*Assistant Examiner* — Timothy P Duncan
(74) *Attorney, Agent, or Firm* — Fish & Richardson P.C.

(57) ABSTRACT

A method includes analyzing, by a processor, a first version of a computer program, the analyzing including identifying a first process included in the first version of the computer program, the first process configured to perform an operation on data having a first format; and by a processor, generating a second version of at least a portion of the computer program, including omitting the first process and including in the second version of the at least portion of the computer program one or more second processes configured to perform a second operation on data of a second format different from the first format, wherein the second operation is based on the first operation.

56 Claims, 10 Drawing Sheets

(51) Int. Cl.
  *G06F 16/901* (2019.01)
  *G06F 8/70* (2018.01)
  *G06F 11/36* (2006.01)
  *G06F 8/71* (2018.01)

(52) U.S. Cl.
  CPC ........ *G06F 11/3696* (2013.01); *G06F 16/258* (2019.01); *G06F 16/9024* (2019.01)

(56) References Cited

U.S. PATENT DOCUMENTS

| | | |
|---|---|---|
| 6,389,429 B1 | 5/2002 | Kane |
| 6,983,317 B1 | 1/2006 | Bishop |
| 7,039,645 B1 | 5/2006 | Neal |
| 8,484,159 B2 * | 7/2013 | Stanfill ............ G06F 8/51 707/609 |
| 8,627,296 B1 | 1/2014 | Picard |
| 8,676,720 B1 | 3/2014 | Neal |
| 8,949,140 B2 | 2/2015 | Liu et al. |
| 10,055,333 B2 | 8/2018 | Offner et al. |
| 2002/0152241 A1 | 10/2002 | Hepworth |
| 2004/0153708 A1 | 8/2004 | Joshi |
| 2007/0011668 A1 | 1/2007 | Wholey et al. |
| 2007/0118278 A1 | 5/2007 | Finn |
| 2008/0270350 A1 | 10/2008 | Bojanic et al. |
| 2009/0055445 A1 * | 2/2009 | Liu ............ G06F 16/258 |
| 2009/0133033 A1 | 5/2009 | Lindo et al. |
| 2010/0153928 A1 * | 6/2010 | Livshits ......... G06F 11/3461 717/132 |
| 2011/0184717 A1 | 7/2011 | Erickson |
| 2011/0271256 A1 | 11/2011 | Robertsson |
| 2011/0307897 A1 * | 12/2011 | Atterbury ......... G06F 9/44521 718/102 |
| 2012/0131559 A1 | 5/2012 | Wu |
| 2012/0179726 A1 * | 7/2012 | Roberts ........... G06F 11/3604 707/798 |
| 2012/0254259 A1 | 10/2012 | McGuire et al. |
| 2014/0141767 A1 | 5/2014 | Sharma |
| 2016/0124836 A1 * | 5/2016 | Isman ............ G06F 11/3636 717/131 |
| 2016/0124998 A1 | 5/2016 | Offner et al. |
| 2017/0177740 A1 * | 6/2017 | Abaya ............ G06F 3/0481 |
| 2018/0232214 A1 | 8/2018 | Isman |

FOREIGN PATENT DOCUMENTS

| | | |
|---|---|---|
| JP | S62-006344 | 1/1987 |
| JP | H10-083328 | 3/1998 |
| JP | 2006-500695 | 1/2006 |
| JP | 2013-171345 | 9/2013 |

OTHER PUBLICATIONS

International Search Report and Written Opinion issued in PCT/US2017/033285, dated Jul. 26, 2017.
International Search Report and Written Opinion, PCT/US2015/059136, dated Feb. 15, 2016 (16 pages).
Cheung et al., "Partial replay of long-running applications", Proceedings of the 19$^{th}$ ACM Sigsoft Symposium and the 13$^{th}$ European Conference on Foundations of Software Engineering, SIGSOFT/FSE, pp. 135-145 (2011).
Honarmand et al., "Reply Debugging: Leveraging Record and Replay for Program Debugging", ACM Sigarch Computer Architecture News, Architecture, pp. 445-456 (2014).
International Preliminary Report on Patentability, PCT/US2015/059136, dated May 9, 2017.
U.S. Appl. No. 14/715,807, filed May 19, 2015, Isman et al.
International Preliminary Report on Patentability, PCT/US2017/033285, dated Dec. 13, 2018.
JP Office Action in Japanese Appln. No. 2017-522000, dated Oct. 29, 2019, 9 pages.
Office Action in CN Appln. No. 201580072406.3, dated Mar. 31, 2020, 23 pages (with English translation).

* cited by examiner

```
//Each overlay file starts with a 3-line header
1 // version
$AI_MP/example_graph.mp // The graph these insertions will be applied to.
1 // order insertions on write
// end of header; beginning of first insertion
ins_1_source.dat // name of the insertion                              ← 202
Database/out // upstream port                                           ← 204
Filter/in    // downstream port                                         ← 206
0 // sequence number at upstream port
0 // is_probe it's a test source                                        ← 208
0 // is_local_file_probe ignored; only for probes
0 // is_phases_file_probe ignored; only for probes
0 // is_clean ignored; only for probes
1 // is_required ignored; only for probes
0 // is_modified
2 // number_of_parameters
!prototype_path|PF$|||$AB_COMPONENTS/Database/Input_File.mdc            ← 210
Layout.$|||file:$AI_SERIAL/test_source_for_replicate.dat                ← 212
// end of first insertion; beginning of second insertion
ins_2.dat // name of the insertion                                      ← 214
Gather/out // upstream port                                             ← 216
OutputDataSource/in // downstream port                                  ← 218
0 // sequence number at upstream port
1 // is_probe it's a probe                                              ← 220
0 // is_local_file_probe
0 // is_phased_file_probe
0 // is_clean
1 // is_required
0 // is_modified ignored; only for test sources
1 // number_of_parameters
!prototype_path|PF$|||$AB_COMPONENTS/Database/Output_File.mdc           ← 222
```

FIG. 4

FORMAT-SPECIFIC DATA PROCESSING OPERATIONS

CLAIM OF PRIORITY

This application claims priority to U.S. Provisional Application Ser. No. 62/345,217, filed on Jun. 3, 2016, the contents of which are incorporated here by reference in their entirety.

BACKGROUND

Complex computations can often be expressed as a data flow through a directed graph (called a "dataflow graph"), with components of the computation being associated with the vertices of the graph and data flows between the components corresponding to links (arcs, edges) of the graph. The components can include data processing components that receive data at one or more input ports, process the data, and provide data from one or more output ports, and dataset components that act as a source or sink of the data flows.

SUMMARY

In an aspect, a method includes analyzing, by a processor, a first version of a computer program, the analyzing including identifying a first process included in the first version of the computer program, the first process configured to perform a first operation on data of a first format; and by a processor, generating a second version of at least a portion of the computer program, including omitting the first process and including in the second version of the at least portion of computer program one or more second processes configured to perform a second operation on data of a second format different from the first format, wherein the second operation is based on the first operation.

Embodiments can include one or more of the following features.

Identifying a first process includes identifying a first process in which the first operation is dependent on the format of the data.

Identifying a first process includes identifying a first process that is unable to perform the first operation on data of the second format.

The method includes determining a format of data to be processed by the first process. Identifying a first process includes identifying a first process that is unable to perform the first operation on data having the format of the data to be processed by the first process.

Identifying a first process includes identifying a first data processing element of the computer program, the first data processing element configured to execute the first process. Including the one or more second processes in the second version of the at least portion of the computer program includes including one or more second data processing elements in the second version of the at least portion of the computer program, the second data processing element configured to execute the one or more second processes.

The first format includes a data type.

The first format includes a size of a data element.

The first process is configured to perform the first operation on data records of a first record format and in which the one or more second processes are configured to perform the second operation on data records of a second record format. The first record format comprises a name of a field in the records.

The method includes presenting, in a user interface, an identifier of the first set of one or more operations.

Generating the second version of at least a portion of the computer program includes generating a copy of the portion of the computer program.

The method includes modifying the copy of the portion of the computer program to omit the first process and to include the one or more second processes.

The method includes executing the second version of the computer program.

The one or more second processes are defined by an overlay specification. Generating the second version of the computer program includes generating the second version based on the first version of the computer program and the overlay specification. The overlay specification identifies one or more of a process upstream of the first process and a process downstream of the first process. The method includes identifying the first process based on an analysis of executable code defining the first process.

The computer program comprises a graph. The first process is an executable process represented by a first component of the graph and in which the one or more second processes are executable processes represented by one or more second components of the graph. The one or more second components are configured to receive data records from an upstream component of the graph. The one or more second components are configured to provide data records to a downstream component of the graph.

In an aspect, a system includes means for analyzing, by a processor, a first version of a computer program, the analyzing including identifying a first process included in the first version of the computer program, the first process configured to perform a first operation on data having a first format; and means for generating, by a processor, a second version of at least a portion of the computer program, including omitting the first process and including in the second version of the at least portion of the computer program one or more second processes configured to perform a second operation on data having a second format different from the first format, wherein the second operation is based on the first operation.

In an aspect, a system includes a processor coupled to a memory, the processor and memory configured to analyze a first version of a computer program, the analyzing including identifying a first process included in the first version of the computer program, the first process configured to perform a first operation on data having a first format; and generate a second version of at least a portion of the computer program, including omitting the first process and including in the second version of the at least portion of the computer program one or more second processes configured to perform a second operation on data having a second format different from the first format, wherein the second operation is based on the first operation.

In an aspect, a non-transitory computer-readable medium stores instructions for causing a computing system to analyze a first version of a computer program, the analyzing including identifying a first process included in the first version of the computer program, the first process configured to perform a first operation on data having a first format; and generate a second version of at least a portion of the computer program, including omitting the first process and including in the second version of the at least portion of the computer program one or more second processes configured to perform a second operation on data having a second format different from the first format, wherein the second operation is based on the first operation.

Other features and advantages will become apparent from the following description, and from the claims.

DESCRIPTION OF DRAWINGS

FIG. 4 is an example of an overlay specification.

DESCRIPTION

Figure 1:
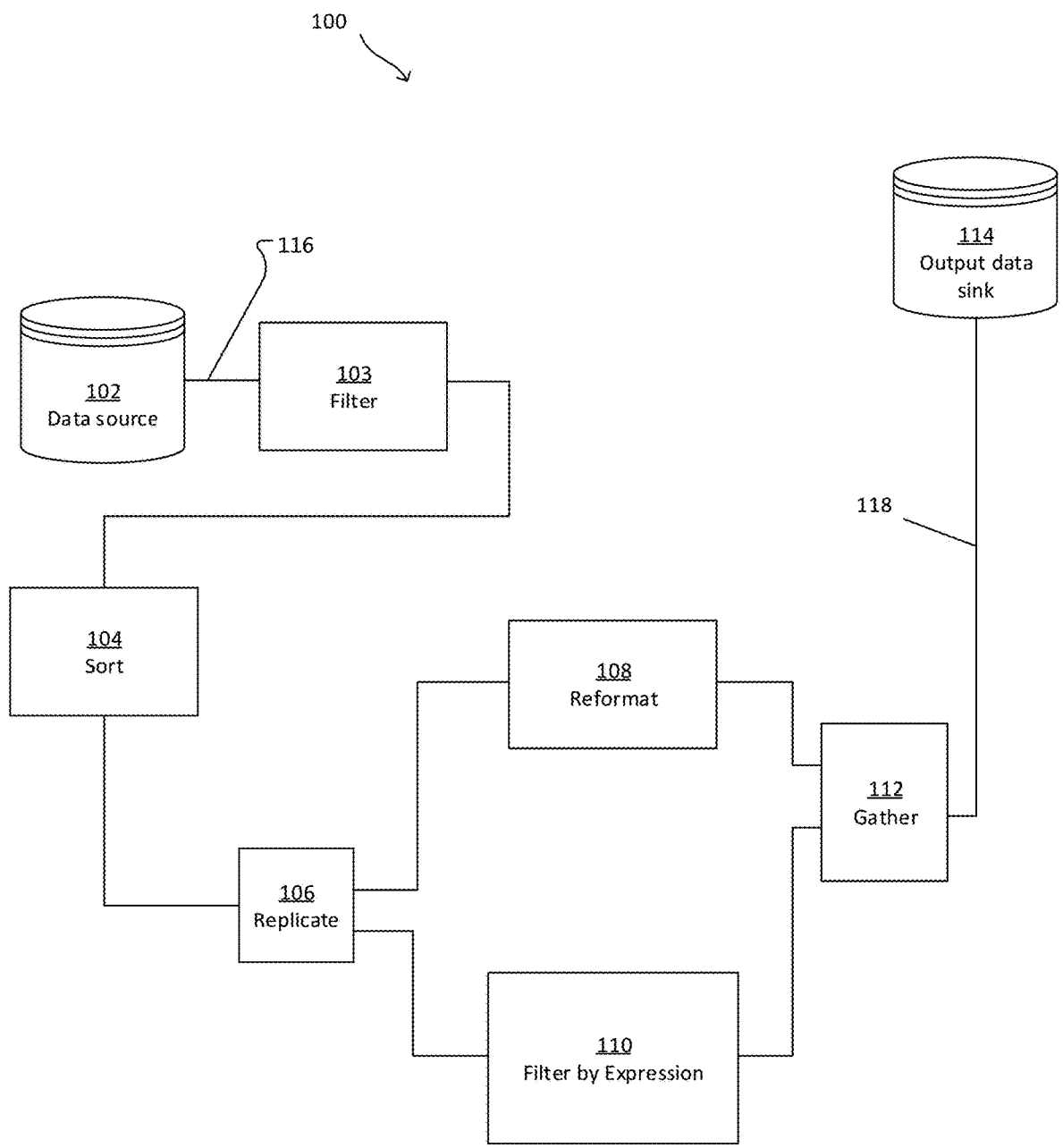
FIGS. 1-3 are examples of graphs.

An executable application, such as a graph, can include one or more processes that are specific to a particular format or formats of data records to be processed by the executable application. Such processes are able to perform operations on data only of the particular format or formats, and attempting to execute these processes on data of a different format may lead to errors or incorrect processing. We describe here an approach to identifying processes of an executable application that are specific to a particular format or formats of data. To enable the executable application to operate on data of a different format, a second version of the executable application can be generated in which those format-specific processes are omitted and one or more other processes are included. These other processes, sometimes referred to as replacement process, can perform an operation that is based on the operation performed by the omitted format-specific processes, but that is either specific to a different one or more formats of data or able to perform operations on any format of data. The inclusion of a replacement process in a second version of an executable application enables the executable application to process data of a different format than the format for which the original version of the executable application was configured.

Replacement processes can be defined by an overlay specification, which is a file that is separate from the original executable application (sometimes also referred to as the first application). The replacement processes defined in the overlay specification can be added into the second version of the application (sometimes also referred to as the second application) without becoming a part of the original application. For instance, when the application is compiled, a compiler considers the overlay file and generates the second application in which one or more processes are omitted and one or more corresponding replacement processes are included. By omitted, we mean that a process that is included in the first application is not included in the second application. The corresponding replacement component is inserted into the second application, e.g., in the location at which the omitted process was located in the first application.

Replacement processes are examples of insertions. Other examples of insertions include test sources and probes, which can also be defined by an overlay specification. A test source is a replacement data source that can provide data, such as test data, for processing by the executable application. A probe is an alternative destination to which data is written by the executable application. Insertions can be useful, e.g., for testing or debugging an executable application, such as a graph. For instance, a tester or developer may want to conduct testing using a particular set of input data to observe the effects of changes to the application. By executing the application using a consistent set of input data both before and after the change, the effect of that change on the data output by the application can be monitored. In some examples, the tester may have a specific set of test data that is to be used when testing the application, such as a set of test data that will cause all of the functions of the application to be executed at least once. Similarly, the tester may wish to write the data output by the application to a particular destination that is different than the standard destination to which the application writes its output data.

In some examples, the insertions can be defined automatically based on an automated analysis of the application. For instance, replacement components can be defined automatically based on an automatic identification of format-specific processes in the application. Test sources and probes can be defined automatically based on an automatic identification of the data sources and output data sinks of the application.

In some examples, the executable application is a graph-based process. A graph-based process includes one or more components, each representing an executable process, connected by flows indicating a flow of data from one component to another. Replacement processes are objects that are associated with a component in the graph-based process. A replacement process (sometimes also called a replacement component) can replace an existing component in a graph such that data that would have been processed by the existing component is instead processed by the replacement component. Test source and probe insertions are objects that are associated with a flow in the graph-based process. A test source can replace data passing through a flow (e.g., upstream data) with new data, such that upstream computations do not need to be rerun for each execution of the graph. For instance, a test source can replace a data source such that test data is provided to the graph from the test source rather than from the data source. A probe can monitor data passing through a flow as the graph executes, and can cause the data to be saved for later examination or reuse. For instance, a probe can receive data that would otherwise have been saved to an output data sink, such as a database.

The insertions defined in the overlay specification can be added into the application during execution without becoming a part of the original application. When the application is compiled, a compiler considers the overlay file and generates an executable application that includes the insertions. We sometimes refer to the original application as the first version of the application and the application that includes the insertions as the second version of the application. For instance, in the example of a graph-based process, the executable graph can be visually represented as a second version of the graph that includes the components of a first version of the graph combined with the insertion objects defined in the overlay specification. In some examples, the executable graph is a shell script and is not stored in a file. In some examples, the executable graph and the graph are stored in separate files.

The incorporation of the insertions into the second version of the graph does not modify the first version of the graph. Instead, the insertion definitions remain in a separate file (e.g., the separate overlay specification) and can be turned into ordinary graph components for inclusion in the modified graph at the beginning of the code generation. As such, there is no risk of inadvertently breaking the original graph.

FIG. 1 shows an example of a graph 100. The graph 100 is a visual representation of a computer program that includes data processing components connected by flows. A flow connecting two components indicates that records output from the first component are passed to the second component. A first component references a second component when the first component is connected to a second component by a flow.

A data source 102, such as a database (as shown), a file, a queue, an executable statement (e.g., a SQL statement) or another type of data source that is external to the graph 100, includes one or more data records to be processed by the graph 100. By external, we mean that the data of the data source 102 is not stored in the graph 100. The data source 102 is connected to a filter component 103 by a flow. In general, a filter component filters or removes records that do not meet predetermined criteria. In this example, the filter component 103 passes data records of customers who live in Ohio and rejects the other records. The filter component 103 is connected to a sort component 104 that sorts the filtered data records by zip code. The sort component 104 is connected to a replicate component 106 that creates a copy of data records so that they can be processed in two different ways. The replicate component is connected to a reformat component 108 and a filter by expression component 110. For example, one instance of data records of customers who live in Ohio, which are sorted by zip code, is sent to the reformat component 108, and another instance of the data records is sent to the filter by expression component 110. The reformat component 108 changes the format of the data records to a different data format, and the filter by expression component 110 removes data records based on an expression associated with the data record. The reformat component 108 and the filter by expression component 110 are connected to a gather component 112 that combines the received data records, and the gather component is connected to an output data sink component 114 that is external to the graph, such as a database (as shown), a file, a queue, or a downstream processing component. By external, we mean that the data of the output data sink 114 is not stored in the graph 100. While the graph 100 includes many flows between components, a flow 116 between the data source 102 and the filter component 103 (which we sometimes refer to as the source-filter flow 116) and a flow 118 between the gather component 112 and the output data sink 114 (which we sometimes refer to as the gather-output flow 118) are of particular interest in this example.

One or more of the components of a graph can be a format-specific component. A format-specific component is a component that is able to process only data of one or more particular formats. Data format is a characteristic of an individual item of data (e.g., a characteristic of a value in a field of a record) or a characteristic of a record (sometimes referred to as record format). Examples of a characteristic of an individual item of data include a number of bytes for the item of data, such as a size of the item of data (e.g., single-byte ASCII data items or multibyte data items), a type of the item of data (e.g., string, integer, Boolean, or another data type), or another characteristic of an individual item of data. Examples of a a record format include the name of a field in a record, the position of a field in a record, the number of fields in a record, a hierarchical record, an array or repeating group of fields, a nested array, a sub-record, or another characteristic of a record.

When a graph includes a component that is specific to a particular data format, the graph may be able to process only data of the particular format. If the graph is used to process data having a different format, an error may occur or the data may be processed incorrectly. In order to enable the graph to process the data having the different format, one or more of the format-specific components can be replaced by components that are able to process the data of the different format. The replacement components can be format-specific components that are specific to the different components or can be components that can process data of any format (which we sometimes call format-agnostic components).

For instance, in the example of FIG. 1, the sort component 104 sorts records by the value in the zip_code field. The sort component 104 in this example is a format-specific component that is capable of processing only integers. An operator of the graph 100 may want to use the graph 100 to process a new set of data in which the zip_code field may include alphanumeric strings.

Figure 2:
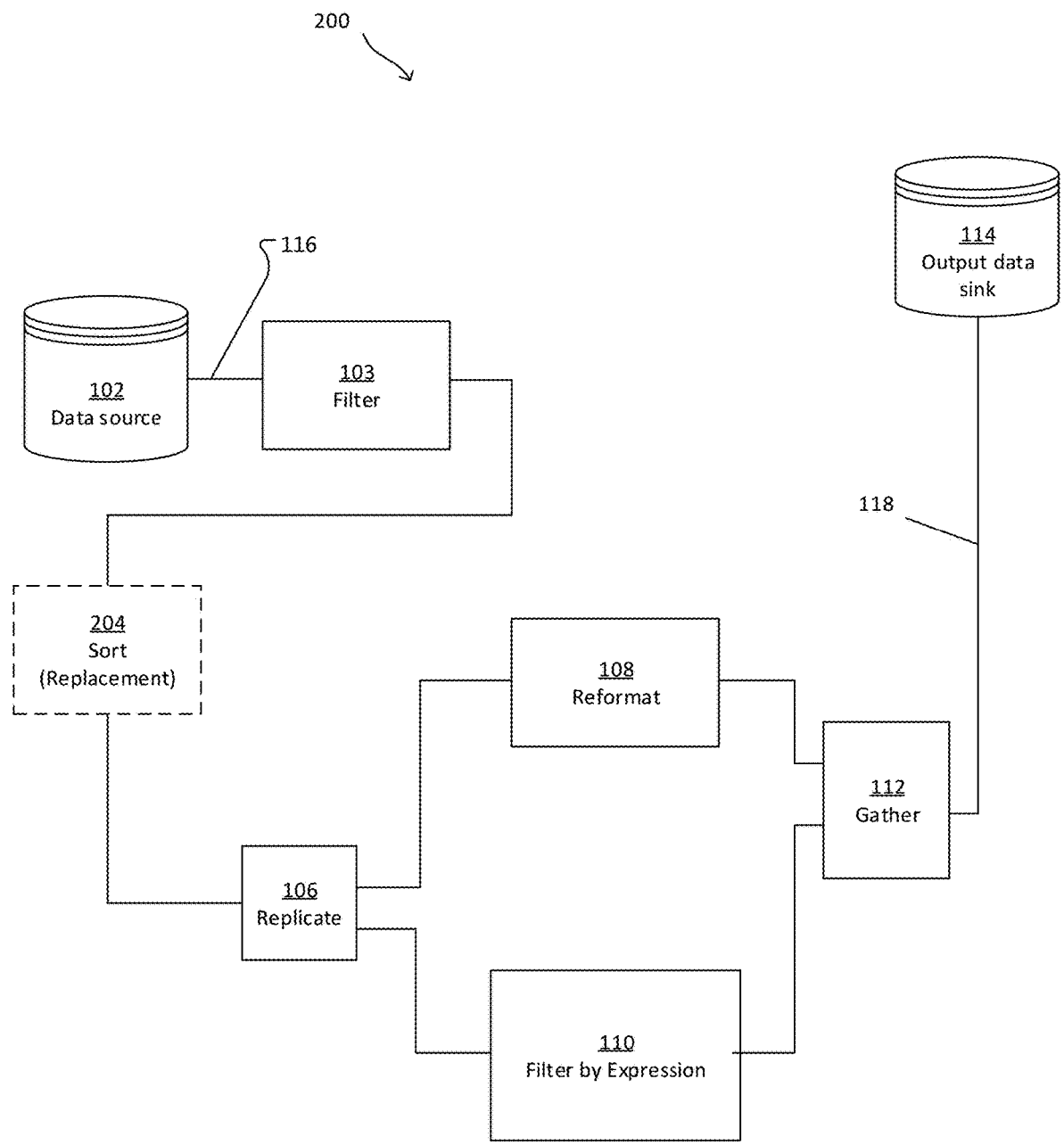

Referring to FIG. 2, a second version 200 of the graph 100 is generated in which the sort component 104 is omitted and a replacement sort component 204 is included. The replacement sort component 204 is placed at the same location in the second version 200 of the graph as the sort component 104, and is able to sort alphanumeric strings. The other components of the graph are unchanged. The second version 200 of the graph is thus able to process the new set of data.

Some components may be able to receive and operate on data of any format but may output data of a specific format. If data of a different format is desired as output (e.g., to be provided as input into another application that specifies a particular format), the graph may be unable to provide this data. In order to enable the graph to output data of the desired format, one or more of the format-specific components can be replaced by components that are able to output data of the desired format.

Referring again to FIG. 1, the reformat component 108 is a format-specific component that outputs data of a particular format. For instance, the reformat component 108 may output data records having four fields: Name, Account_num, Balance, and Trans_date. An operator of the graph 100 may want the graph 100 to generate output data of a different format, for instance, so that the output data can be processed by another application having specific requirements for the record format of its input data. In this example, the desired format of the output data includes four fields: Cust name, Balance, Account_num, and Trans_date. That is, the first field of the output data needs to be renamed and the second and third fields need to be switched.

Figure 3:
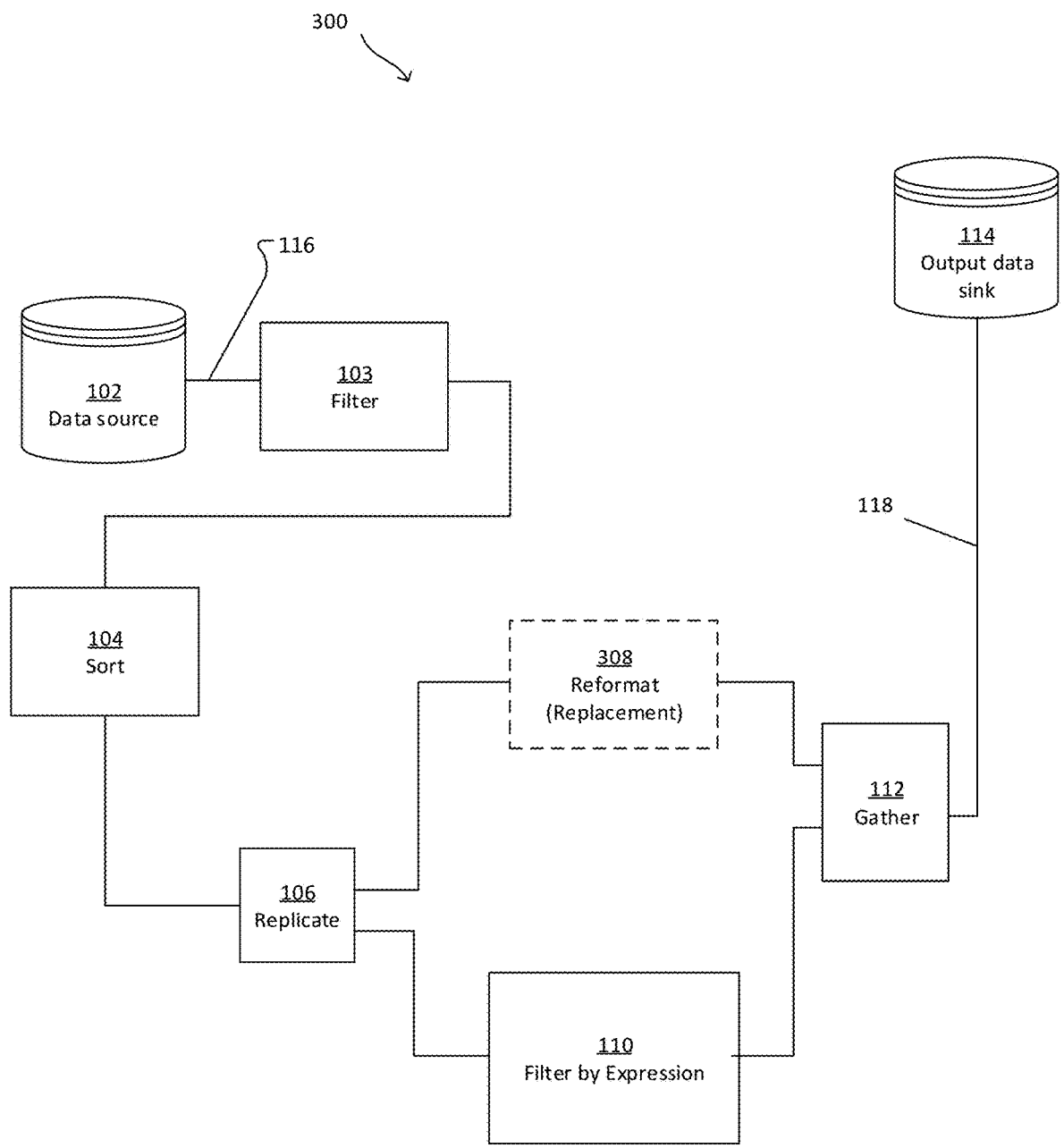

Referring to FIG. 3, a second version 300 of the graph 100 is generated in which the reformat component 108 is omitted and a replacement reformat component 308 is included. The replacement reformat component 308 is placed at the same location in the second version 300 of the graph as the reformat component 108, and is able to generate output data of the desired format. The other components of the graph are unchanged.

In some examples, other components of a graph can also be omitted, such as one or more components upstream or downstream of a format-specific component. In some cases, a replacement component can be included in place of one or more of the other omitted components.

In some examples, a tester of the graph 100 may wish to debug the graph 100 in order to verify its functionality. In some cases, a tester may want to verify data as it flows from one component to another. In some cases, a tester may want to bypass upstream components in a graph 100, and instead insert data at the locations of the bypassed components. In some cases, a tester may want to test the operation of the graph 100 using a consistent set of input data in order to monitor the effect of changing the graph on the data output by the graph. In some cases, a tester may want to test the operation of the graph 100 using a set of input data that the tester knows will cause all of the functions of the graph to be executed at least once, thus enabling complete testing of the graph.

In debugging the graph 100, it may be desirable to refrain from modifying the graph. For example, a tester may not want to risk breaking the functionality of the graph. In some examples, a tester may have limited or no access to the graph (e.g., the tester may lack the necessary permissions to edit the graph). In order to debug the graph 100 without modifying the graph, an overlay can be used to debug the graph. In some examples, the overlay can be specified automatically, e.g., based on an automated analysis of the graph. A second version of at least a portion of the graph 100 can be generated based on the original graph 100 (sometimes called the first version of the graph) and the overlay specification.

A probe collects or monitors data as it is passed through a flow between components of the graph 100, e.g., along a flow from a first component to a second component or along a flow to an output data sink. For example, data can be monitored, saved for later examination, or saved for re-use when it passes through a flow as the graph 100 executes. The overlay specification can define a probe that refers to a flow that carries data that is to be collected or monitored. The probe specifies the flow through which data is to be collected or monitored. The probe can be configured to report particular values, or report when a particular value is within or outside of a predetermined range. Data that is passed through the probe may be saved for later analysis or use, for example, the data can be stored in a flat file or relational database.

In some examples, the probe can refer to a flow from a component of the graph 100 to an output data sink, such as a file or a database. By placing a probe along a flow to a data sink during debugging of the graph 100, the probe receives the data output from the graph 100. For instance, each time the graph 100 is executed in a debugging mode, the output data can be received by a probe and written to a file so that the output data from various graph executions can be compared or otherwise evaluated. In some examples, an output data sink is automatically identified and an overlay is automatically specified to define a probe for insertion prior to the identified output data sink.

In some examples, the probe can refer to a flow from an upstream component of the graph 100 to a downstream component. By placing a probe along a flow to a downstream component during debugging of the graph 100, the probe receives the data that would otherwise have been received by the downstream component, thus preventing the downstream component from executing. For instance, a tester may wish to monitor the results of the graph processing prior to the downstream component. For instance, the downstream component may have a functionality that has an effect external to the graph, e.g., the downstream component may send a text message to each person whose credit card record is processed by the downstream component. During debugging of the graph, a tester may wish to disable such components that have an effect external to the graph.

A test source inserts data into the graph 100 at a particular flow between two components of the graph 100. The overlay specification can define a test source that refers to a flow that carries data that is to be replaced with data from the test source. In some examples, the test source replaces data that would normally pass through a flow with new data. In some scenarios, the test source can be configured to read previously saved data, and pass the data to the downstream component. In some examples, a test source inserts data into the graph 100 at a flow from a data source, such as a database or file. The test source can insert data having the same format as the data that would otherwise have been provided by the data source. In some examples, a data source is automatically identified and an overlay is automatically specified to define a test source to replace the identified data source.

In some examples, the results of the execution of the graph 100 up to a certain point (e.g., up to a certain component) may have been previously verified. In other words, upstream process functions may have been verified up to a certain point. In such cases, it may be inefficient for upstream components to reprocess functions every time the graph 100 executes. The test source can insert data (e.g., the previously verified data) into the graph at that certain point. In this manner, entire sections of a graph 100 that were previously executed may be bypassed.

FIG. 4 shows an example of an overlay specification 200 that defines one or more insertions. An insertion can be an object that is associated with a flow of a graph (e.g., the graph 100), and can take the form of a probe, a test source, or a replacement component. In the example of FIG. 4, the overlay specification 200 includes one test source definition 201 and one probe definition 213. The overlay specification 200 can be stored in a file, such as a file that is separate from a file containing the specification for the graph 100.

The overlay specification 200 starts with a 3-line header that specifies the graph that the insertion definitions can correspond to. The header is followed by the test source definition 201, the probe definition 213, and a replacement component definition (not shown).

The test source definition 201 includes a name 202, an upstream port 204, a downstream port 206, an insertion type 208, a prototype path 210, and a layout parameter 212.

The upstream port 204 of the test source definition 201 references an output port of the component that is directly upstream from the flow where the test source is to be inserted into the graph 100. A component that is upstream from a flow is a component from whose output port data is output onto the flow. In the example of FIG. 4, the upstream port 204 of the test source definition 201 points to the output of the database 102. The downstream port 206 of the test source definition 201 references an input port of the component that is directly downstream from the flow where the test source is to be inserted into the graph 100. A component that is downstream from a flow is a component at whose input port data is received from the flow. In the example of FIG. 4, the downstream port 206 of the test source definition points to the input of the filter component 103. The test source definition 201 in this example thus indicates that a test source is to be placed in the flow between the output of the database 102 and the input of the filter component 103 such that data provided by the test source can replace input data from the database 102.

The insertion type 208 defines whether the insertion is a test source, a probe, or a replacement component. In the example of FIG. 4, a value of "0" defines a test source, a value of "1" defines a probe, and a value of "2" defines a replacement component. Other values can also be used to define the type of the insertion. Because this insertion is a test source, the value of the insertion type 208 is "0".

The prototype path 210 indicates the type of the insertion. In this example, because this insertion is a test source, the prototype path 210 specifies an input file component. The prototype path 210 points to a file that contains the code that defines an insertion of the particular type. A layout parameter 212 defines a location of a source file that contains data that the test source will contain. In some examples, the location is a file path. The data in the source file is to replace the data that would normally pass through the flow defined by the upstream port 204 and the downstream port 206. That is, when the test source is applied to the graph 100, the filter component 103 receives the data in the source file rather than receiving data from the database 102.

The source file contains data having the same format as the data that would otherwise be received by the component downstream of the test source. In some examples, the data in the source file may be the same as the data in the data source (e.g., the database) that is upstream from the test source. For instance, data records from the database 102 can be copied into the source file. In some examples, the data source indicates an executable statement, such as a SQL query. In these examples, the SQL query can be executed and the results of the query execution can be stored in the source file. In some examples, the data in the source file can be obtained from somewhere other than the data source. For instance, the data in the source file can be generated in order to ensure that certain data (e.g., certain ranges of values) are processed for complete debugging of the graph 100. In some examples, the data in the source file remains the same even if the data in the data source changes, thus allowing debugging to continue with a consistent set of input data.

In some examples, the data in the source file may be the same as the data that would pass through the flow during normal execution of the graph 100, but by inserting the data using a test source, upstream components can refrain from processing. For example, an upstream component, such as the replicate component 106, may require large amounts of system resources to process the data, or may take a relatively long time to process the data compared to other components in the data flow graph 100. As such, known data (e.g., the same data that would pass through the flow during normal execution) can be inserted into the flow to save time or to conserve system resources.

The probe definition 213 includes a name 214, an upstream port 216, a downstream port 218, an insertion type 220, and a prototype path 222.

The upstream port 216 of the probe definition 213 references an output port of the component that is directly upstream from the flow where the probe is to be inserted into the graph 100. In the example of FIG. 4, the upstream port 216 of the probe definition 213 points to the output of the gather component 112. The downstream port 218 of the probe definition 213 references an input port of the component that is directly downstream from the flow where the probe is to be inserted into the graph 100. In the example of FIG. 4, the downstream port 218 of the probe definition 213 points to the output data sink component 114. The probe definition 213 in this example thus indicates that a probe is to be placed in the flow between the output of the gather component 112 and the output data sink component 114 such that the probe receives data that would otherwise have been written to the output data sink component.

The insertion type 220 of the probe definition 213 defines whether the insertion is a test source, a probe, or a replacement component. Because this insertion is a probe, the value of the insertion type 220 is "1".

The prototype path 222 indicates the type of the insertion. In this example, because this insertion is a probe, the prototype path 222 specifies an output file component. The prototype path 222 points to a file that contains the code that defines an insertion of the particular type.

In some examples, the data that is to be monitored by the probe is stored in a file that is automatically created by the system. The file can be stored in a location that is determined by the system. The probe monitors data that passes through the flow defined by the upstream port 216 and the downstream port 218. That is, when the probe is applied to the graph 100, the data that passes from the output of the gather component 112 to the input of the output data sink component 114 is monitored and stored in the file that is automatically created by the system. In some examples, the data can be monitored before it is stored. The file is capable of receiving data of the same format that would have been received by the component referenced by the probe definition (in this example, the external data sink component 114).

In some examples, one or more probe or test source insertions can be defined by the overlay specification as a result of an automated analysis of the graph 100. For instance, an automated analysis of the graph 100 can be conducted to identify any data sources, such as databases, files, or other types of data sources. One or more of the identified data sources can be automatically replaced by a test source. By a replaced data source, we mean that a test source is inserted into the flow directly downstream of the data source such that data from the test source is provided to the downstream component rather than data from the data source. Similarly, an automated analysis of the graph 100 can identify any output data sinks, such as databases, files, or other types of output data sinks. One or more of the identified output data sinks can be automatically replaced by a probe. By a replaced output data sink, we mean that a probe is inserted into the flow directly upstream of the output data sink such that data from the upstream component is received by the probe rather than by the output data sink. Automated analysis of the graph 100 can also be used to identify other components, such as a particular type of component (e.g., a particular type of component whose execution has an effect external to the graph 100).

Further description of test sources and probes insertions is provided in U.S. patent application Ser. No. 14/715,807, the contents of which are incorporated here by reference in their entirety.

The replacement component definition includes a name, an upstream port, a downstream port, an insertion type, a prototype path, and a layout parameter. The upstream port of the replacement component definition references an output port of the component that is directly upstream of where the replacement component is to be inserted into the graph 100. The downstream port of the replacement component definition references an input port of the component that is directly downstream from where the replacement component is to be inserted into the graph. Based on the upstream port and the downstream port, the existing component in the graph 100 that is to be replaced by the replacement component can be identified. The insertion type defines that the insertion is a replacement component.

The prototype path indicates the type of the insertion. In this example, because this insertion is a replacement component, the prototype path points to a file that contains the code that defines the replacement component. The code that defines the replacement component is based on the code defining the existing component that is to be replaced, but able to process data of the desired format.

In some examples, one or more replacement components for a graph can be defined by the overlay specification as a result of an automated analysis of the graph. For instance, the specification of each component in the graph can be analyzed. The specification for a component includes or points to code that defines the component, e.g., that defines the data processing operation(s) that are represented by the component. An analysis of the code can reveal whether the data processing operation(s) represented by a component are dependent on the format of the data.

A replacement component is defined for one or more of the identified format-specific components. In some examples, the format-specific components that are to be replaced are identified based on user input. For instance, a user may use his knowledge of the format of the incoming data, the processes represented by each of the format-specific components, or both, to determine which of the components are to be replaced. In some examples, an automatic analysis of the format of incoming data relative to the format of data previously processed by the graph can be performed to identify which of the format-specific components are to be replaced.

In some examples, for computer programs that are not graph-based, one or more format-specific processes in a computer program can be identified and replaced by one or more other processes, e.g., processes that can operate on data of a specific format or processes that can operate on data of any format.

Figure 5:
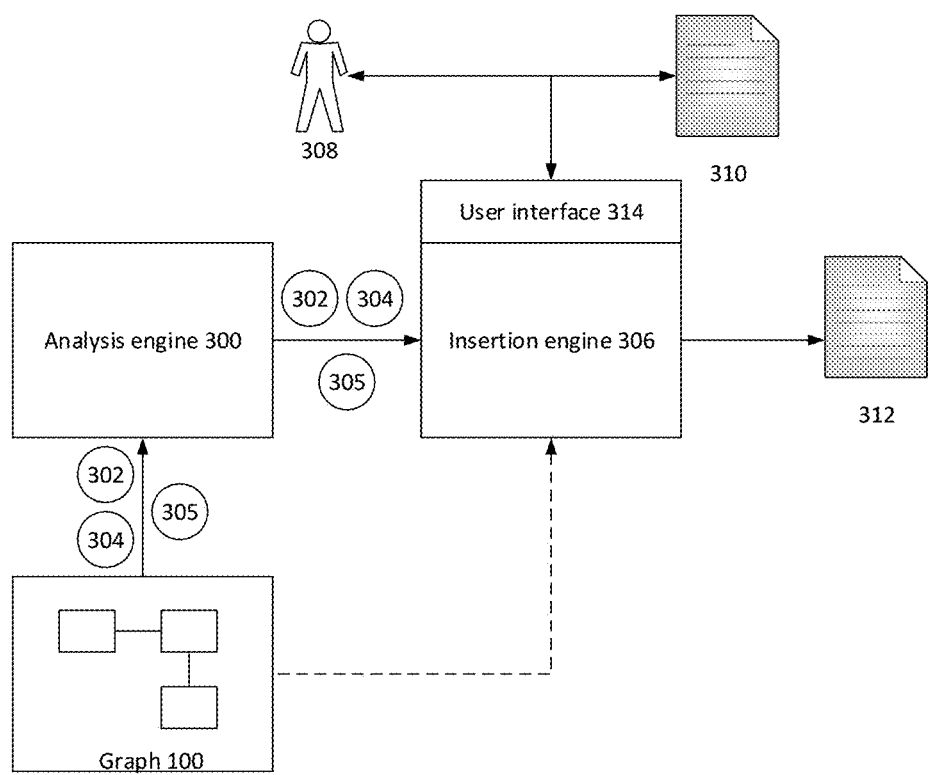
FIG. 5 is a block diagram.

Referring to FIG. 5, to insert test sources, probes, or both, an analysis engine 300 automatically analyzes the graph 100 to identify data sources 302 and output data sinks 304. For instance, the analysis engine 300 can access the parameters and connections for each node of the graph 100 (we sometimes use the terms "node" and "component" interchangeably). If a given node has no incoming connections, the analysis engine 300 identifies the node as a data source. Similarly, if a given node has no outgoing connections, the analysis engine 300 identifies the node as an output data sink. To access and analyze each node of a graph, the analysis engine "walks" along all of the connections (we sometimes use the terms "connection" and "flow" interchangeably) of the graph. In some examples, the graph 100 is not instantiated or parameterized until runtime (e.g., when processing starts for debugging purposes). The analysis engine 300 can perform an automated analysis at runtime to identify data sources and output data sinks in the graph 100.

The analysis engine 300 sends identifiers of the data sources 302 and output data sinks 304 to an insertion engine 306, which determines which of the data sources and output data sinks are to be replaced by test sources and probes, respectively. In some examples, a tester 308 provides a list 310 of data sources and output data sinks that are to be replaced by test sources and probes. The list 310 can be provided as a file, a database, or in another format. For instance, the tester 308 might include on the list 310 any data source that he expects to change frequently. By replacing such a data source with a test source, the tester 308 can ensure that the graph can be tested using consistent input data.

The insertion engine 306 compares each identified data source 302 and output data sink 304 with the data sources and output data sinks on the list 310. The insertion engine creates an overlay specification 312 for any data source 302 or output data sink 304 that appears on the list 310. In some examples, parameters for the overlay specification 312, such as upstream and downstream ports, is provided to the insertion engine 306 by the analysis engine 300. In some examples, the insertion engine 306 accesses the graph 100 to obtain the relevant parameters.

To create an overlay specification 312 for a test source, the insertion engine 306 populates the source file with data. In some examples, the insertion engine 306 populates the source file for a test source that will replace a particular data source 302 with data copied from the data source 302. In some examples, the data source 302 includes an executable expression, such as a SQL statement, and the insertion engine 306 executes the executable expression and populates the source file with the results of the execution. In some examples, the insertion engine 306 can prompt the tester 308 for data for the source file through a user interface 314. For instance, the insertion engine 306 can present a list of the identified data sources 302 to the tester 308 such that the tester 308 can select which of the identified data sources 302 are to be replaced by a test source. The tester 308 can also specify the data to be included in the source file for the test source. In some cases, the tester 308 can identify a location (e.g, a path) of a file that includes data for the test source. In some cases, the tester 308 can instruct the insertion engine 308 to generate a source file that is a copy of the data in the original data source 302. In some cases, the tester 308 can instruct the insertion engine 308 to execute an executable expression, such as a SQL statement, that is included or associated with the original data source 302. In some cases, the tester 308 can cause data to be generated for the source file of the test source. For instance, the tester 308 may provide a set of data, such as real data or generated data, that will cause every function in the graph to execute at least once.

To create an overlay specification 312 for a probe, the insertion engine 308 determines the location of the file where the output data is to be stored. In some examples, the location is set by default, e.g., by a system architect. In some examples, the insertion engine 306 can prompt the tester 308 through the user interface 314 to specify a location for the output data file.

To insert a replacement component, the analysis engine 300 analyzes the graph 100 to identify one or more format-specific components 305 in the graph. To analyze each component of the graph, the analysis engine 300 "walks" along all of the connections of the graph. In some examples, the analysis engine 300 may start at a farthest upstream component of the graph and "walk" along each output flow from that upstream component, thus eventually analyzing all of the components of the graph. Conversely, the analysis engine 300 may start at a farthest downstream component of the graph and "walk" along each input flow to that downstream component, thus eventually analyzing all of the components of the graph.

The analysis engine 300 can access the specification of each component in the graph 100. The specification for a component includes or points to code that defines the component, e.g., that defines the data processing operation(s) that are represented by the component. Based on an analysis of the code, the analysis engine 300 can determine whether the data processing operation(s) are dependent on the format of the data. The analysis engine 300 sends identifiers of the format-specific components to the insertion engine 306, which determines which of the format-specific components is to omitted in favor of a replacement component.

In some examples, the analysis engine 300 analyzes the graph 100 upon user request. For instance, a user may want to use the graph 100 to process data of a different format than the data usually processed by the graph. The user can request an analysis of the graph 100 in order to ensure that the graph 100 is able to process the data of the different format.

In some examples, the analysis engine 300 analyzes the graph 100 once, e.g., when the graph is first defined or when the graph is first instantiated or parameterized (e.g., at the first runtime of the graph), in order to generate a list of all of the format-specific components in the graph. The list of format-specific components in the graph can be stored for future reference, e.g., to be used responsive to a user request to use the graph 100 to process data of a different format.

In some examples, the analysis engine 300 automatically determines when to analyze the graph. For instance, a specification of the graph may include a description of the format of data previously processed by the graph. If the format of incoming data is different from the format of previously processed data, the analysis engine may analyze the graph to determine whether any components need to be replaced in order to process the incoming data of the different format.

The insertion engine 306 determines which of the format-specific components identified by the analysis engine 300 are to be omitted. The insertion engine 306 creates an overlay specification that defines the replacement component for each of the components to be omitted.

In some examples, the format-specific components that are to be omitted are identified by a user. For instance, the insertion engine 306 can cause the list of identified format-specific components to be displayed on the user interface 314, and a user selects the components that are to be replaced. The user can indicate a component to be used as the replacement component for each of the components that are to be replaced. For instance, the user may use his knowledge of the format of the incoming data, the processes represented by each of the format-specific components, or both, to determine which of the components are to be omitted and which components are to be included as replacement components. Based on user input identifying the components to be omitted, identifying the replacement components, or both, the insertion engine 306 creates the overlay specification.

In some examples, the insertion engine 306 can automatically determine which of the format-specific components are to be omitted and which components are to be included as replacement components. For instance, the insertion engine can analyze the specification of each of the format-specific components to determine which components are able or unable to process the incoming data. The insertion engine 306 can automatically identify a replacement component, e.g., a replacement component that represents the same data processing operation represented by the corresponding component to be replaced, but capable of processing data of the format of the incoming data. The insertion engine 306 creates the overlay specification for the automatically identified replacement components. In some examples, user input is incorporated into the automated determination. For instance, a user may be asked to approve the replacement components identified by the insertion engine 306.

Figure 6:
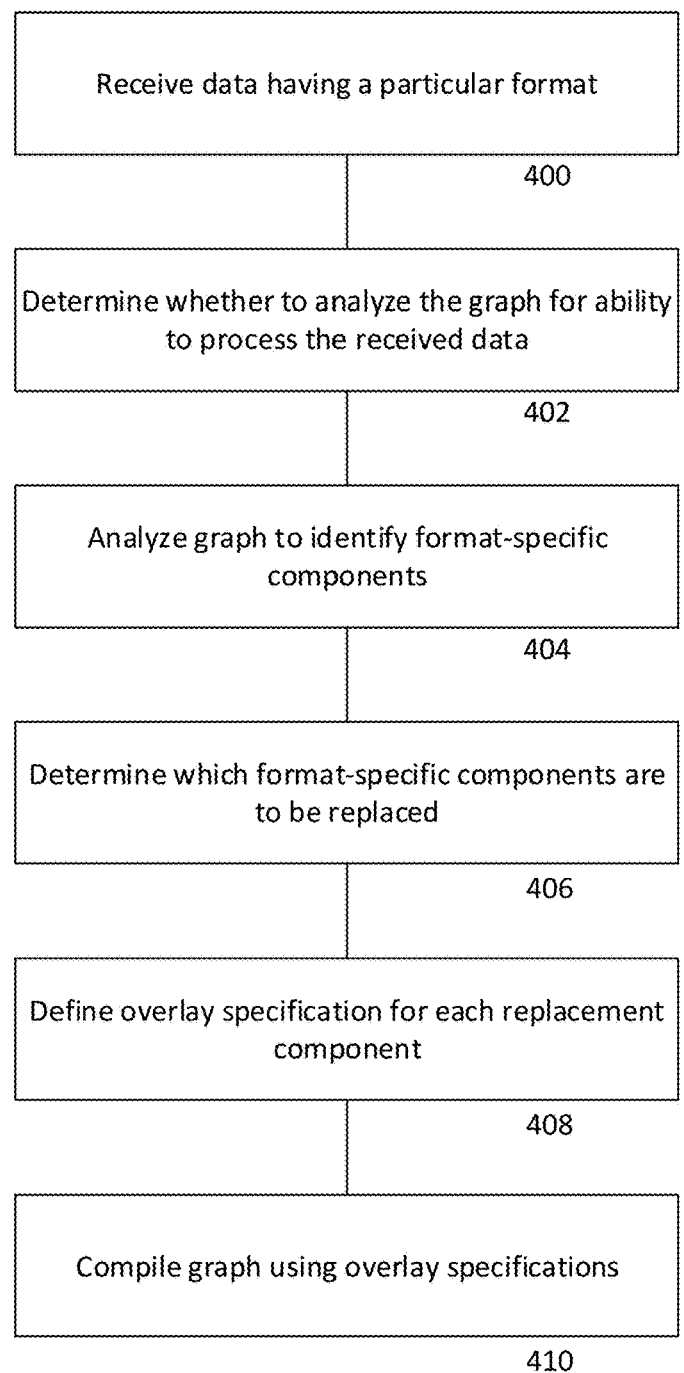
FIG. 6 is a flow chart.

FIG. 6 shows a general approach to defining a replacement component for a graph. A set of data having a particular format is received for processing by the graph (400). A determination is made as to whether the graph is to be analyzed for its ability to process the particular format of the received data (402). In some examples, a user can provide an indication, e.g., through a user interface, that the graph is to be analyzed. For instance, the user may know that the set of data has a different format than previous data processed by the graph. In some examples, the determination can be made automatically. For instance, the format of the received data can be determined and compared, e.g., to information stored in the specification of the graph indicative of the format of data for which the graph is configured. If the format of the received data does not match the format of data for which the graph is configured, the graph is analyzed.

The graph is analyzed, e.g., by a processor, to identify one or more components of the graph that are dependent on the format of data processed by the component (404). In particular, the specification for each of one or more of the components of the graph is analyzed to identify format-specific components in the graph. In some examples, the graph is analyzed by a stepwise progression through the components of the graph. For instance, each component is analyzed both to determine whether the component is a format-specific component and to identify its incoming and outgoing flows. Each flow from is followed to the adjacent component, and each of those components is analyzed to determine whether the component is format-specific and to identify the incoming and outgoing flows. In this way, all of the components of the graph can be analyzed. In some examples, the analysis can be performed automatically at runtime, e.g., after the graph has been parameterized. In some examples, the analysis can be performed automatically and dynamically, e.g., while the graph is running. For instance, a dynamic analysis can be performed when certain parameters are resolved during the execution of the graph. In some examples, the graph is received into short-term memory, from where the graph is analyzed by a processor to identify format-specific components.

One or more of the components identified as format-specific are evaluated to determine whether the components are to be omitted and replacement components included (406). For instance, a format-specific component may be omitted if the component is unable to process data having the format of the received set of data. In some examples, a list of the format-specific components is displayed on a user interface and a user indicates which of the components is to be omitted. In some examples, the specification of each of the format-specific components is evaluated to automatically determine whether the components are capable of processing data having the format of the received set of data. In some examples, all of the components identified as format-specific are omitted.

An overlay specification is defined for a replacement component for each of one or more of the format-specific components that are to be omitted (408). The specification for a given replacement component is based on the specification of the corresponding omitted format-specific component, but defines one or more data processing operations that are able to be performed on data having the format of the received set of data. In some examples, the replacement components can be format-specific to the format of the received set of data. In some examples, the replacement components can be generic, e.g., able to process data of any format.

Prior to execution of the graph, a compiler may compile the graph into an executable graph (410). As part of compilation, the compiler considers the overlay specification 200 defining the replacement components. For example, the compiler may accept the overlay specification 200 as an input. A second version of the graph is generated, the format-specific components identified for replacement are removed, and the one or more replacement components are inserted into the second version of the graph as objects in place of the removed components. The replacement components may be represented in the second version of the graph along with the data processing components included in the first version of the graph 100 (other than the removed components). The overlay specification 200, or the file that stores the overlay specification, remains separate from a file containing the graph. That is, while the replacement components may appear in the second version of the graph along with the data processing components included in the first version of the graph, the file containing the first version of the graph does not include the definitions of the replacement components.

Insertions, such as test sources, probes, or replacement components, defined in the overlay specification can be executed using one of at least two modes: Single-Execution Mode and Saved-State Mode.

Figure 7:
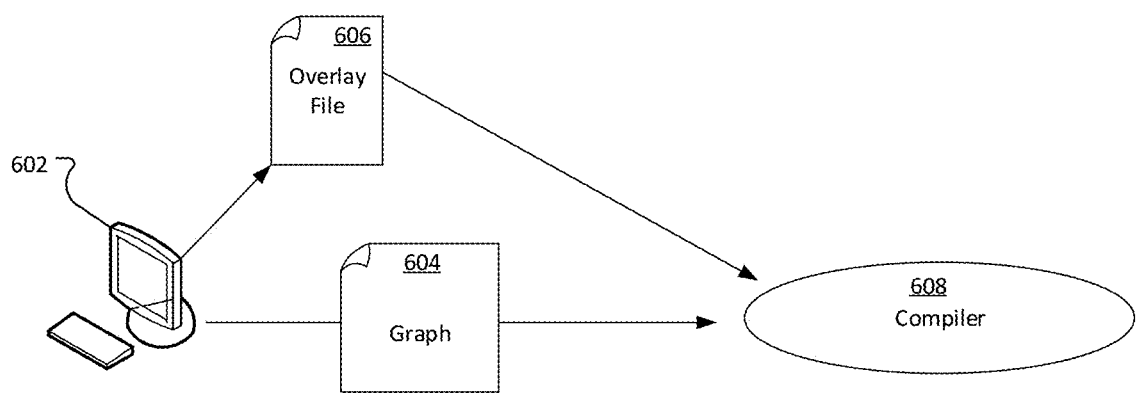
FIGS. 7-9 are block diagrams.

FIG. 7 illustrates an example system for executing insertion definitions in Single-Execution Mode. In this example, a client 602 generates or references a first version of a graph 604 and an overlay file 606 (e.g., an overlay specification) that defines insertions. For example, the overlay file 606 may be the overlay specification 200 of FIG. 4. The graph 604 is then compiled by the compiler 608. The compiler 608 considers the overlay file 606 and creates a second version of the graph. The second version of the graph is executable and includes the insertions defined by the overlay file 606. The second version of the graph can then be executed. In some examples, the compilation and the execution occur concurrently. If the second version of the graph is to be executed again, this process is repeated, including re-specifying, re-compiling the graph 604 and re-executing second version of the graph. No information is saved from one execution of the executable graph to the next.

Figure 8:
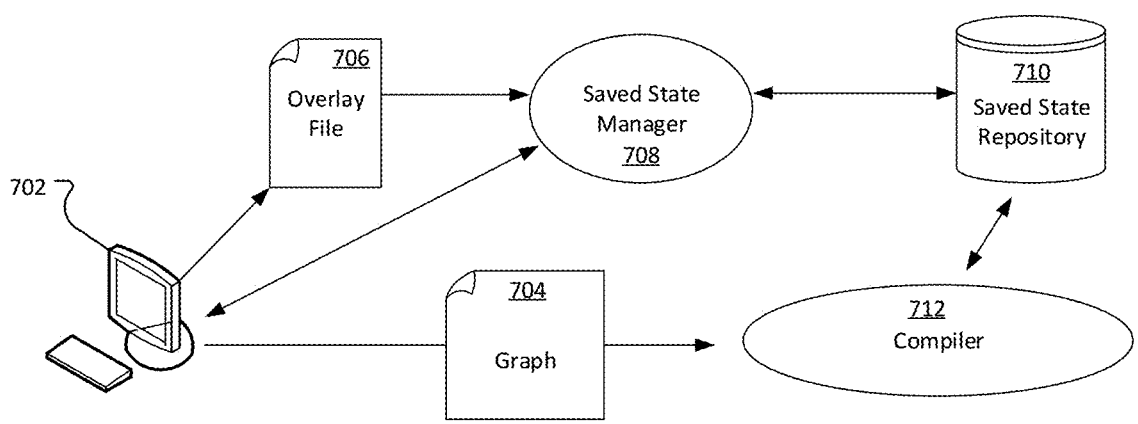

FIG. 8 illustrates an example system for executing insertion definitions in Saved-State Mode with a saved state manager 708. In this example, a client 702 generates or references a graph 704 and an overlay file 706 (e.g., an overlay specification) that defines insertions. For example, the overlay file 706 may be the overlay specification 200 of FIG. 4. The saved state repository 710 is managed by the saved state manager 708 and a compiler 712. The saved state manager 708 can also identify where the saved state data is located within the saved state repository 710. The graph 704 is compiled by the compiler 712. The compiler 712 considers the overlay file 706 and creates a second version of the graph that includes the insertions defined by the overlay file 706. The second version of the graph can then be executed. In some examples, the compilation and the execution occur concurrently. Saved-State Mode differs from Single-Execution Mode in that Saved-State Mode allows the executable graph to execute a number of times while saving information between executions.

The saved state manager 708, which can reside in a saved state manager directory, manages the saved state. Examples of information that can be saved in the saved state repository 710 include information related to probe insertions, information related to test source insertions, information related to replacement component insertions, information related to the overlay file 706, and parameters (e.g., attributes) associated with graph components, among other information.

In some examples, when an executable graph is executed, only particular portions of the graph are executed. That is, only particular components of the graph are executed. In some examples, fewer than all of the components of the graph are executed. The executable graph may only execute components that will impact an insertion. In some examples, the second version of the graph is a second version of the entire original graph. In some examples, the second version of the graph is a second version of only a portion of the entire original graph, e.g., a second version of only those portions of the graph that are relevant for the defined insertions. For example, components that are upstream from the most upstream replacement component may be executed by the first version of the graph, and components starting at the most upstream replacement component may be executed by the second version of the graph.

Figure 9:
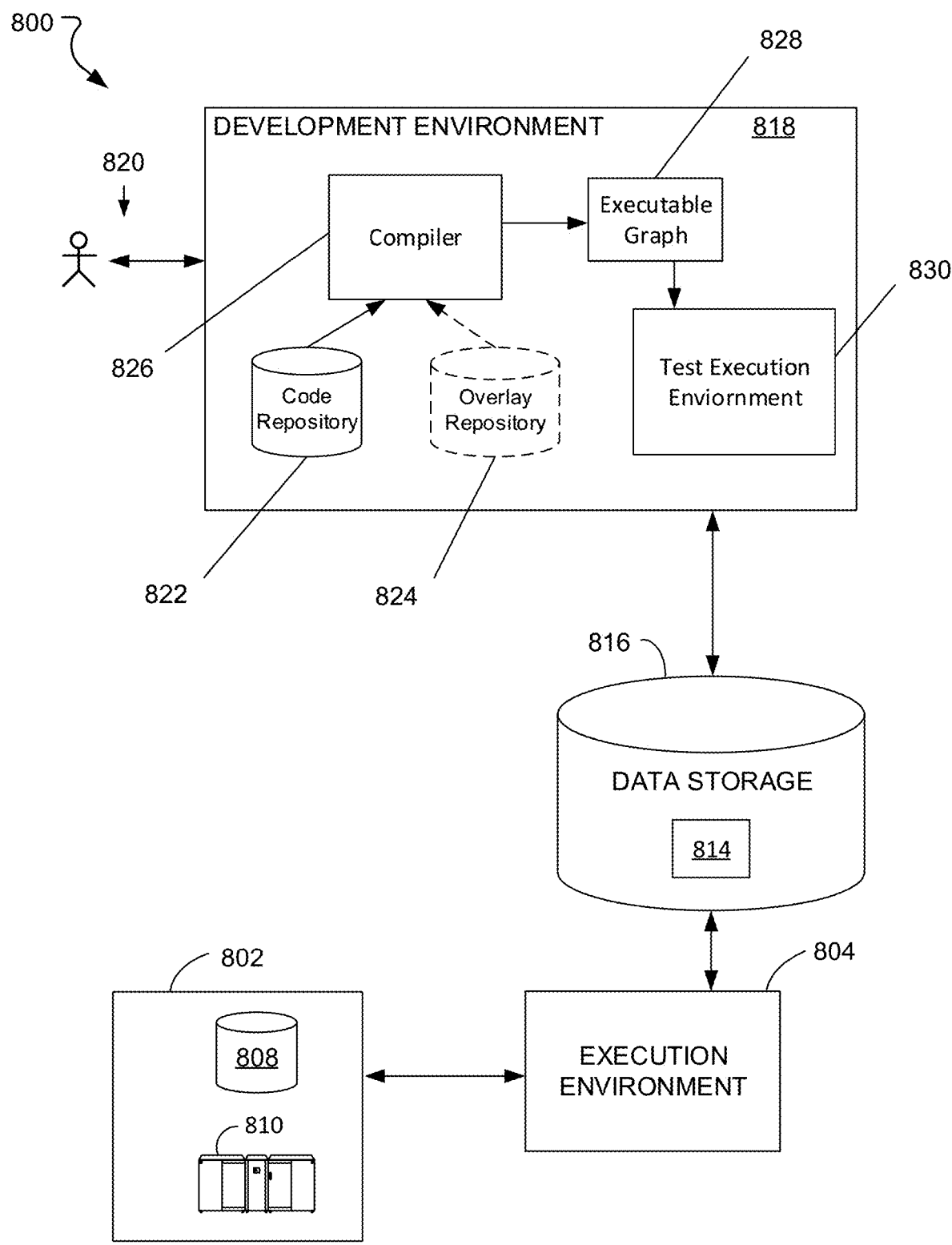

FIG. 9 shows an example data processing system 800 in which the replacement component techniques described here can be used. The system 800 includes a data source 802 that may include one or more sources of data such as storage devices or connections to online data streams, each of which may store or provide data in any of a variety of formats (e.g., database tables, spreadsheet files, flat text files, or a native format used by a mainframe). An execution environment 804 and development environment 818 may be hosted, for example, on one or more general-purpose computers under the control of a suitable operating system, such as a version of the UNIX operating system. For example, the execution environment 804 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

The execution environment 804 reads data from the data source 802 and generates output data. Storage devices providing the data source 802 may be local to the execution environment 804, for example, being stored on a storage medium connected to a computer hosting the execution environment 804 (e.g., hard drive 808), or may be remote to the execution environment 804, for example, being hosted on a remote system (e.g., mainframe 810) in communication with a computer hosting the execution environment 804, over a remote connection (e.g., provided by a cloud computing infrastructure). The data source 802 may contain the data that is defined in a test source definition (e.g., the test source definition 201 of FIG. 4). That is, the layout parameter 212 of the test source definition 201 may point to a location of a source file in the data source 802.

The output data may be stored back in the data source 802 or in a data storage system 816 accessible to the execution environment 804, or otherwise used. The data storage system 816 is also accessible to the development environment 818 in which a developer 820 is able to develop, debug, and test graphs. The development environment 818 is, in some implementations, a system for developing applications as graphs that include vertices (representing data processing components or datasets) connected by directed flows (representing flows of work elements, i.e., data) between the vertices. For example, such an environment is described in more detail in U.S. Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," incorporated herein by reference. Graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the flows of the graph can use TCP/IP or UNIX domain sockets, or use shared memory to pass data between the processes).

The development environment 818 includes a code repository 822 for storing source code. In some examples, the source code and overlay specifications (e.g., the overlay specification 220 of FIG. 4) may be developed by a developer 820 who has access to the development environment, for example, through a user interface. In some examples, the source code and overlay specifications are determined automatically, e.g., by the analysis engine 300 and insertion engine 306 described above. In some examples, graphs and overlay specifications can be stored in the code repository 822. In some examples, graphs are stored in the code repository 822, and overlay specifications are stored in a separate overlay repository 824.

One or both of the code repository 822 and the overlay repository 824 may be in communication with a compiler 826. The compiler 826 can compile a first version of a graph and an overlay specification (e.g., the overlay specification 200 of FIG. 4) into an executable second version of the graph 828. For example, the compiler may accept the overlay specification as an input. One or more insertions are processed and inserted into the graph in the form of objects that each corresponds to an insertion definition contained in the overlay specification. The second version of the graph 828 can be visually represented by a modified graph. The insertion objects may be represented in the second version of the graph 500.

The development environment 818 can include an execution environment 830 for executing the second version of the graph 828. For example, once a graph is compiled by the compiler 826, the second version of the graph 828 can be executed. Executing the second version of the graph 828 can include executing computations associated with the components, insertions (e.g., test sources, probes, replacement components, or a combination of any two or more of them), and directed flows of the second version of the graph 828 as data (e.g., work elements or data records) flows between components. In some examples, the execution environment 830 executes the second version of the graph 828 without modifying the source code of the first version graph that is stored in the code repository 822 or the source code stored in the overlay repository 824. The execution environment 830 may be accessible through an interface of the development environment 818, or may have its own interface. The interface can be configured to display information related to the executions. The interface can also be configured to display information related to the insertions (e.g., the data being monitored and saved by a probe, the data being inserted by a test source, information about a replacement component, or other information). The execution environment 830 may allow the developer 820 to execute the second version of the graph 828 multiple times and modify aspects of the second version of the graph 828 in between executions.

In some examples, a developer directs the insertions and compiling of the graph. For instance, a developer 820 selects, from the code repository 822, the first version of the graph 100 of FIG. 1. The developer 820 also selects, from the overlay repository 824, the overlay specification 200 of FIG. 4. In some examples, instead of selecting the overlay specification 200, the developer 820 may select insertion definitions from various overlay specification in the overlay repository 824. The developer 820 instructs the compiler 826 to compile the second version of the graph 828 based on the first version of the graph 100 and the overlay specification 200.

In some examples, the insertions are inserted automatically. For instance, as described above, one or more data sources, output data sinks, or format-specific components in the graph 100 are automatically identified, e.g., by identifying components that have no incoming connections or no outgoing connections or by analyzing the specification of components in the graph 100. The identified data sources and output data sinks can be automatically compared to a list of data sources and output data sinks that are to be replaced by insertions during debugging of the graph 100. For instance, the list can be provided by the developer 820. Format-specific components can be analyzed to determine whether the components are capable of processing data of a particular format, such as the format of an incoming set of data. A list of format-specific components that are not capable of processing the data is generated. In some examples, the list can be provided by the developer 820. Overlay specifications are automatically created for the data sources, output data sinks, or format-specific components of the graph 100 according to the list. The second version of the graph is then compiled automatically.

In some examples, overlay specifications are not permanently stored as files in a code repository 822 or an overlay repository 824. Rather, the information that would typically be included in the overlay file (e.g., insertion definitions) is developed by the developer 820 (e.g., through the user interface) or determined automatically by the analysis engine 300 and insertion engine 306 and temporarily stored in memory. The overlay information is then passed to the compiler (e.g., 608 of FIG. 8) or the saved state manager (e.g., 708 of FIG. 9).

Figure 10:
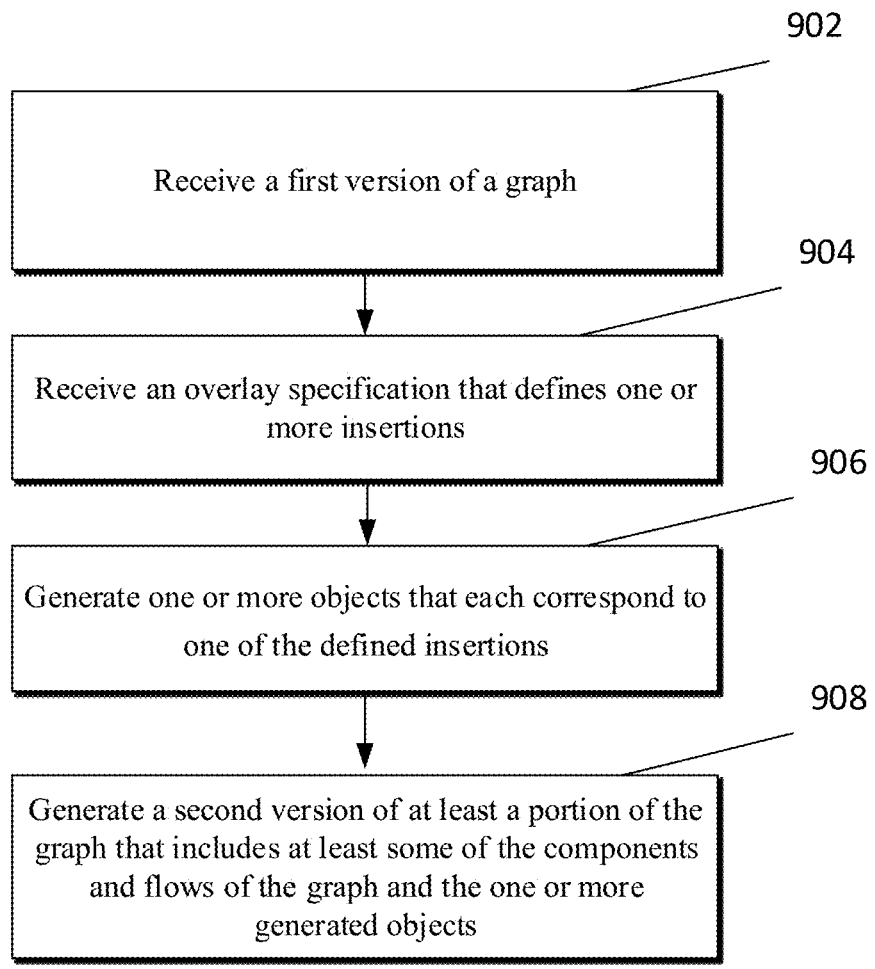
FIG. 10 is a flow chart.

Referring to FIG. 10, in an example process, a first version of a graph (e.g., the graph 100 of FIG. 1) is received (902). For instance, the first version of the graph can be received into a short-term memory that is accessible by a processor. The first version of the graph 100 includes components and flows. The components represent operations performed on data records, and the flows represent flows of data records between components.

An overlay specification that defines one or more insertions is received (904). In some examples, the overlay specification is received from a developer or tester. In some examples, the overlay specification is defined automatically, e.g., as described above. The overlay specification may be the overlay specification 200 shown in FIG. 4. The overlay specification can include one or more insertion definitions (e.g., one or more test source definitions, one or more probe definitions, or one or more replacement component definitions). An insertion definition can include a name, an upstream port, a downstream port, an insertion type, a prototype path, and a layout parameter (for test source definitions). Each of the defined test sources and probes can be associated with a flow of the graph 100. Each of the defined replacement components can be associated with a component of the graph 100.

One or more objects are generated that each corresponds to one of the defined insertions (906). The objects may be components of a graph, such as test sources, probes, or replacement components.

A second version of at least a portion of the graph is generated that includes at least some of the components and flows of the portion of the graph 100 as well as the one or more generated objects (908). In some examples, the second version of the graph is a copy of the original graph 100 that is modified to include at least some of the components and flows of the portion of the graph 100 as well as the one or more generated objects. The second version of the graph can be visually represented by a modified graph (e.g., the second version of the graph 200 of FIG. 2 or the third version of the graph 300 of FIG. 3). Each object is inserted at the flow associated with the defined insertion that corresponds to the object (for test sources or probes), or in place of the component associated with the defined replacement component that corresponds to the object. While the generated insertion objects may appear in the second version of the graph along with the data processing components of the graph 100, the first version of the graph 100 (or the file containing the first version of the graph 100) is not modified.

While we described a compiler (e.g., compiler 608 of FIG. 7 and compiler 712 of FIG. 8) that can compile the graph and the overlay specification to create second version of the graph that includes the insertions defined by the overlay file, in some embodiments, the graph and the overlay specification are not compiled. For example, the graph and the overlay specification can be executed directly without being compiled. An interpreter can execute the graph and the overlay specification directly by translating each statement into a sequence of one or more subroutines that are already compiled into machine code.

While we have described insertions in the form of probes, test sources, and replacement components, in some embodiments, insertions can take on other forms. Insertions can broadly be used to inject data at a given point of a graph and pull data from a given point of a graph. For example, an insertion can be designed to monitor the quality of data passing through a flow of a graph. If data quality falls below a threshold, a user can receive an automated alert. Further description of insertions can be found in U.S. application Ser. No. 14/715,904, the contents of which are incorporated here by reference in their entirety.

Furthermore, while we have described insertions in the context of graphs, in some embodiments, insertions can be used in conjunction with other executable applications. For instance, data sources, output data sinks, or format-specific processes for a generic executable application can be identified through an automated analysis of the application. One or more of the identified data sources, output data sinks, or format-specific processes can be replaced by an appropriate test source, probe, or replacement process, respectively. In this way, the executable application can process data from a test source and output data to a probe or can be made able to process data of a different format. This configuration can be useful for testing or debugging the executable application.

The approaches described above can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of graphs. The modules of the program (e.g., elements of a graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method including:

analyzing, by one or more processors, a first version of a computer program, the analyzing including identifying a first process included in the first version of the computer program, the first process corresponding to and configured to perform a first operation on data of a first format;

wherein the first process is defined by a first specification, wherein the first specification identifies the first format of data;

defining, based on the analysis, a second specification based on the first specification, wherein the second specification identifies a second format of data different from the first format;

wherein the second specification defines one or more second processes that are configured to perform a second operation on data of the second format, wherein the second operation is based on the first operation; and by one or more processors, generating a second version of at least a portion of the computer program based on the first version of the computer program and using the second specification, including:

omitting the first process form the second version, and including, in the second version of the at least portion of the computer program, the one or more second processes defined by the second specification.

2. The method of claim 1, in which identifying the first process includes identifying a process in which the first operation is dependent on a format of the data.

3. The method of claim 1, in which identifying the first process includes identifying a process that is unable to perform the first operation on data of the second format.

4. The method of claim 1, including determining a format of data to be processed by the first process.

5. The method of claim 4, in which identifying the first process includes identifying a process that is unable to perform the first operation on data having the format of the data to be processed by the first process.

6. The method of claim 1, in which identifying the first process includes identifying a first data processing element of the computer program, the first data processing element configured to execute the first process.

7. The method of claim 6, in which including the one or more second processes in the computer program includes including one or more second data processing elements in the second version of the at least portion of the computer program, the second data processing element configured to execute the one or more second processes.

8. The method of claim 1, in which the first format comprises a data type.

9. The method of claim 1, in which the first format includes a size of a data element.

10. The method of claim 1, in which the first process is configured to perform the first operation on data records of a first record format and in which the one or more second processes are configured to perform the second operation on data records of a second record format.

11. The method of claim 10, in which the first record format comprises a name of a field in the records.

12. The method of claim 1, including presenting, in a user interface, an identifier of the first operation.

13. The method of claim 1, in which generating the second version of at least a portion of the computer program includes generating a copy of the portion of the computer program.

14. The method of claim 13, including modifying the copy of the portion of the computer program to omit the first process and to include the one or more second processes.

15. The method of claim 1, including executing the second version of the computer program.

16. The method of claim 1, wherein the second specification is an overlay specification.

17. The method of claim 16, in which generating the second version of the computer program includes generating the second version based on the first version of the computer program and using the overlay specification.

18. The method of claim 16, in which the overlay specification identifies one or more of a process upstream of the first process and a process downstream of the first process.

19. The method of claim 16, including identifying the first process based on an analysis of executable code defining the first process.

20. The method of claim 1, in which the computer program comprises a graph.

21. The method of claim 20, in which the first process is an executable process represented by a first component of the graph and in which the one or more second processes are executable processes represented by one or more second components of the graph.

22. The method of claim 21, in which the one or more second components are configured to receive data records from an upstream component of the graph.

23. The method of claim 21, in which the one or more second components are configured to provide data records to a downstream component of the graph.

24. A system including:
means for analyzing, by a processor, a first version of a computer program, the analyzing including identifying a first process included in the first version of the computer program, the first process corresponding to and configured to perform a first operation on data of a first format;
wherein the first process is defined by a first specification, wherein the first specification identifies the first format of data;
means for defining, based on the analysis, a second specification based on the first specification, wherein the second specification identifies a second format of data different from the first format;
wherein the second specification defines one or more second processes that are configured to perform a second operation on data of the second format, wherein the second operation is based on the first operation; and
means for generating, by a processor, a second version of at least a portion of the computer program based on the first version of the computer program and using the second specification, the generating including:
omitting the first process from the second version, and
including, in the second version of the at least portion of the computer program, the one or more second processes defined by the second specification.

25. A system including:
one or more processors coupled to a memory, the one or more processors and memory configured to:
analyze a first version of a computer program, the analyzing including identifying a first process included in the first version of the computer program, the first process corresponding to and configured to perform a first operation on data of a first format;
wherein the first process is defined by a first specification, wherein the first specification identifies the first format of data;
define, based on the analysis, a second specification based on the first specification, wherein the second specification identifies a second format of data different from the first format;
wherein the second specification defines one or more second processes that are configured to perform a second operation on data of the second format, wherein the second operation is based on the first operation; and
generate a second version of at least a portion of the computer program based on the first version of the computer program and using the second specification, including:
omitting the first process from the second version, and
including, in the second version of the at least portion of the computer program, one or more second processes defined by the second specification.

26. The system of claim 25, in which identifying the first process includes identifying a process in which the first operation is dependent on a format of the data.

27. The system of claim 25, in which identifying the first process includes identifying a process that is unable to perform the first operation on data of the second format.

28. The system of claim 25, the one or more processors and memory configured to determine a format of data to be processed by the first process.

29. The system of claim 28, in which identifying the first process includes identifying a process that is unable to perform the first operation on data having the format of the data to be processed by the first process.

30. The system of claim 25, in which identifying the first process includes identifying a first data processing element of the computer program, the first data processing element configured to execute the first process.

31. The system of claim 30, in which including the one or more second processes in the computer program includes including one or more second data processing elements in the second version of the at least portion of the computer program, the second data processing element configured to execute the one or more second processes.

32. The system of claim 25, in which the first process is configured to perform the first operation on data records of a first record format and in which the one or more second processes are configured to perform the second operation on data records of a second record format.

33. The system of claim 25, in which generating the second version of at least a portion of the computer program includes generating a copy of the portion of the computer program.

34. The system of claim 33, the one or more processors and memory configured to modify the copy of the portion of the computer program to omit the first process and to include the one or more second processes.

35. The system of claim 25, the one or more processors and memory configured to execute the second version of the computer program.

36. The system of claim 25, in which the one or more second processes are defined by wherein the second specification is an overlay specification.

37. The system of claim 36, in which generating the second version of the computer program includes generating the second version based on the first version of the computer program and using the overlay specification.

38. The system of claim 36, the one or more processors and memory configured to identify the first process based on an analysis of executable code defining the first process.

39. The system of claim 25, in which the computer program comprises a graph.

40. The system of claim 39, in which the first process is an executable process represented by a first component of the graph and in which the one or more second processes are executable processes represented by one or more second components of the graph.

41. A non-transitory computer-readable medium storing instructions for causing a computing system to:
analyze a first version of a computer program, the analyzing including identifying a first process included in the first version of the computer program, the first process corresponding to and configured to perform a first operation on data of a first format;
wherein the first process is defined by a first specification, wherein the first specification identifies the first format of data;
define, based on the analysis, a second specification based on the first specification, wherein the second specification identifies a second format of data different from the first format;
wherein the second specification defines one or more second processes that are configured to perform a second operation on data of the second format, wherein the second operation is based on the first operation; and
generate a second version of at least a portion of the computer program based on the first version of the computer program and using the second specification, including:
omitting the first process from the second version, and
including, in the second version of the at least portion of the computer program, the one or more second processes defined by the second specification.

42. The non-transitory computer-readable medium of claim 41, in which identifying the first process includes identifying a process in which the first operation is dependent on a format of the data.

43. The non-transitory computer-readable medium of claim 41, in which identifying the first process includes identifying a process that is unable to perform the first operation on data of the second format.

44. The non-transitory computer-readable medium of claim 41, the instructions causing the computing system to determine a format of data to be processed by the first process.

45. The non-transitory computer-readable medium of claim 44, in which identifying the first process includes identifying a process that is unable to perform the first operation on data having the format of the data to be processed by the first process.

46. The non-transitory computer-readable medium of claim 41, in which identifying the first process includes identifying a first data processing element of the computer program, the first data processing element configured to execute the first process.

47. The non-transitory computer-readable medium of claim 46, in which including the one or more second processes in the computer program includes including one or more second data processing elements in the second version of the at least portion of the computer program, the second data processing element configured to execute the one or more second processes.

48. The non-transitory computer-readable medium of claim 41, in which the first process is configured to perform the first operation on data records of a first record format and in which the one or more second processes are configured to perform the second operation on data records of a second record format.

49. The non-transitory computer-readable medium of claim 41, in which generating the second version of at least a portion of the computer program includes generating a copy of the portion of the computer program.

50. The non-transitory computer-readable medium of claim 49, the instructions causing the computing system to modify the copy of the portion of the computer program to omit the first process and to include the one or more second processes.

51. The non-transitory computer-readable medium of claim 41, the instructions causing the computing system to execute the second version of the computer program.

52. The non-transitory computer-readable medium of claim 41, wherein the second specification is an overlay specification.

53. The non-transitory computer-readable medium of claim 52, in which generating the second version of the computer program includes generating the second version based on the first version of the computer program and using the overlay specification.

54. The non-transitory computer-readable medium of claim 52, the instructions causing the computing system to identify the first process based on an analysis of executable code defining the first process.

55. The non-transitory computer-readable medium of claim 41, in which the computer program comprises a graph.

56. The non-transitory computer-readable medium of claim 55, in which the first process is an executable process represented by a first component of the graph and in which the one or more second processes are executable processes represented by one or more second components of the graph.

\* \* \* \* \*

UNITED STATES PATENT AND TRADEMARK OFFICE
CERTIFICATE OF CORRECTION

PATENT NO. : 10,936,289 B2
APPLICATION NO. : 15/433467
DATED : March 2, 2021
INVENTOR(S) : Marshall A. Isman and John Joyce Page 1 of 1

It is certified that error appears in the above-identified patent and that said Letters Patent is hereby corrected as shown below:

On the Title Page

Column 2, Line 8, item (57) under "ABSTRACT", delete "at least portion" and insert -- at least a portion --

In the Claims

Column 20, Line 54, Claim 1, delete "form" and insert -- from --

Column 20, Line 55, Claim 1, delete "at least portion" and insert -- at least a portion --

Column 21, Line 10, Claim 7, delete "at least portion" and insert -- at least a portion --

Column 22, Line 17, Claim 24, delete "at least portion" and insert -- at least a portion --

Column 23, Line 4, Claim 31, delete "at least portion" and insert -- at least a portion --

Column 23, Lines 24-25, Claim 36, before "wherein", delete "in which the one or more second processes are defined by"

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*